United States Patent
Gotoh et al.

(10) Patent No.: US 9,071,366 B2
(45) Date of Patent: Jun. 30, 2015

(54) INFORMATION TRANSMISSION SYSTEM

(71) Applicant: GENETEC CORPORATION, Tokyo (JP)

(72) Inventors: Yoshihito Gotoh, Tokyo (JP); Kenji Ueno, Tokyo (JP)

(73) Assignee: Genetec Corporation, Tokyo (JP)

( * ) Notice: Subject to any disclaimer, the term of this patent is extended or adjusted under 35 U.S.C. 154(b) by 60 days.

(21) Appl. No.: 14/047,747

(22) Filed: Oct. 7, 2013

(65) Prior Publication Data
US 2014/0038513 A1    Feb. 6, 2014

Related U.S. Application Data

(63) Continuation of application No. PCT/JP2012/002261, filed on Apr. 2, 2012.

(30) Foreign Application Priority Data

Apr. 7, 2011    (JP) ................................ 2011-084986

(51) Int. Cl.
*H04M 11/04* (2006.01)
*H04H 20/59* (2008.01)
(Continued)

(52) U.S. Cl.
CPC ............. *H04H 20/59* (2013.01); *G08B 25/016* (2013.01); *G08B 27/006* (2013.01)

(58) Field of Classification Search
CPC ..... H04W 4/22; H04W 76/007; H04W 4/008; H04W 88/04; H04W 4/02; H04W 4/12; G01S 19/17; H04M 3/5116; H04M 2242/04; H04M 2250/10; H04M 11/04; H04M 1/72536; H04M 1/72538; H04L 12/5865; H04L 67/28; H04L 12/1895; G08B 25/006
USPC ............... 455/412.2, 404.1, 404.2, 41.1, 466, 455/426.1, 456.1, 456.6, 90.1; 709/204–207, 217–219
See application file for complete search history.

(56) References Cited

U.S. PATENT DOCUMENTS 7,312,712 B1 * 12/2007 Worrall et al. ............. 340/573.4
2005/0272368 A1 * 12/2005 Langsenkamp et al. ..... 455/12.1
(Continued)

FOREIGN PATENT DOCUMENTS

JP    2001-229151 A    8/2001
JP    2004-094295 A    3/2004
(Continued)

OTHER PUBLICATIONS

Japanese Notice of Reasons for Rejection in corresponding Japanese application No. 2013-508751 dated Apr. 17, 2013 (9 pages).
(Continued)

*Primary Examiner* — Sujatha Sharma
(74) *Attorney, Agent, or Firm* — Nakanishi IP Associates, LLC

(57) ABSTRACT

An information transmission system includes a message generation unit for creating a first message which contains specific information having information on a location and is to be transmitted to mobile phones and a database which is used for creating the first message and contains location information per mobile phone and safety information per user of the mobile phone. The first message has two or more hyperlinks to be used for sending a reply regarding safety of a user of a transmission-destination mobile phone. URL information associated with the hyperlink contains different parameters depending on a type of the reply regarding safety of the user of the mobile phone. The safety information in the database is updated based on the reply regarding safety using any one of the two or more hyperlinks.

12 Claims, 12 Drawing Sheets

Example:
Contents of first SMS message to be transmitted to first mobile phone

Earthquake with intensity 3 and threat of Tsunami hit Takamatsu-city, Kagawa prefecture around 10:30 on December 2, 2007.
} Specific information display section Second mobile phone is at Urayasu-city, Chiba prefecture as at 10:08.
Fourth mobile phone is at Shizuoka-city Shimizu-ku Ninomarucho, Shizuoka prefecture as at 8:30.
Fifth mobile phone is at Takamatsu-city Kaminocho 1, Kagawa prefecture as at 10:15.
} Location information display section for destination mobile phones Click http://dengon.jp/?b=0903347****&a=1, if you are safe.
Click http://dengon.jp/?b=0903347****&a=2, if you are not safe.
} URL display section for sending reply regarding safety

(51) Int. Cl.
*G08B 25/01* (2006.01)
*G08B 27/00* (2006.01)

(56) References Cited

U.S. PATENT DOCUMENTS

| | | |
|---|---|---|
| 2009/0309742 A1 | 12/2009 | Alexander et al. |
| 2010/0113072 A1 | 5/2010 | Gibson et al. |
| 2014/0257985 A1 | 9/2014 | Gibson et al. |
| 2014/0287711 A1* | 9/2014 | Williams et al. ............ 455/404.1 |
| 2014/0364081 A1* | 12/2014 | Rauner ....................... 455/404.2 |
| 2014/0365390 A1* | 12/2014 | Braun .......................... 705/325 |

FOREIGN PATENT DOCUMENTS

| | | |
|---|---|---|
| JP | 2004-227245 A | 8/2004 |
| JP | 2005-080211 A | 3/2005 |
| JP | 2006-338277 A | 12/2006 |
| JP | 2009-165091 A | 7/2009 |
| JP | 2010-045641 A | 2/2010 |
| JP | 2011-34351 A | 2/2011 |

OTHER PUBLICATIONS

International Search Report issued in International Application No. PCT/JP2012/002261, mailed on Apr. 24, 2012 and translation thereof (5 pages).

Written Opinion of the International Search Authority issued in Application No. PCT/JP2012/002261, mailed on Oct. 8, 2013, and translation thereof (9 pages).

Extended European Search Report issued in Application No. 12767944.7, issued on Jan. 23, 2015 (7 pages).

* cited by examiner

Fig. 2

| Mobile phone name | Phone number | Latitude | Longitude | Measurement time/date | Positioning accuracy | Safety information reception time/date | Safety information |
|---|---|---|---|---|---|---|---|
| First mobile phone 201 | 090—3347—**** | 35.657102 | 139.745820 | 10:10 on December 2, 2007 | 1 | - | 0 |
| Second mobile phone 202 | 090—○○□□—××△△ | 35.632221 | 139.883071 | 10:08 on December 2, 2007 | 3 | - | 0 |
| Third mobile phone 203 | 090—××○○—△△×× | 35.632224 | 139.883075 | 10:12 on December 2, 2007 | 3 | - | 0 |
| Fourth mobile phone 204 | 090—□□□□—○○×× | 35.022952 | 138.479662 | 08:30 on December 2, 2007 | 2 | - | 0 |
| Fifth mobile phone 205 | 090—△△××—□□×× | 34.321205 | 134.045113 | 10:15 on December 2, 2007 | 1 | - | 0 |

Fig. 3

| Latitude | Longitude | Area name |
|---|---|---|
| ... | ... | ... |
| 34.320651 | 134.047992 | Takamatsu-city Kaminocho 2, Kagawa prefecture |
| 34.321207 | 134.045112 | Takamatsu-city Kaminocho 1, Kagawa prefecture |
| 34.322504 | 134.051178 | Takamatsu-city Kaminocho 3, Kagawa prefecture |
| ... | ... | ... |
| 35.022647 | 138.480526 | Shizuoka-city Shimizu-ku Ninomarucho 4, Shizuoka prefecture |
| 35.022953 | 138.479664 | Shizuoka-city Shimizu-ku Ninomarucho 3, Shizuoka prefecture |
| 35.023428 | 138.479754 | Shizuoka-city Shimizu-ku Ninomarucho 2, Shizuoka prefecture |
| ... | ... | ... |
| 35.632226 | 139.883076 | Urayasu-city Maihama 1, Chiba prefecture |
| 35.636206 | 139.889068 | Urayasu-city Maihama 3, Chiba prefecture |
| 35.640095 | 139.884202 | Urayasu-city Maihama 2, Chiba prefecture |
| ... | ... | ... |
| 35.655436 | 139.751744 | Minato-ku Shibakoen 2, Tokyo prefecture |
| 35.657143 | 139.745972 | Minato-ku Shibakoen 4, Tokyo prefecture |
| 35.660000 | 139.746334 | Minato-ku Shibakoen 3, Tokyo prefecture |
| ... | ... | ... |

Fig. 4

| Mobile phone name | Mobile phones' names corresponding to location information to be contained in SMS message (Mobile phones' names corresponding to location information to be sent to transmission-destination mobile phone) |
|---|---|
| First mobile phone 201 | Second mobile phone 202, Fourth mobile phone 204, Fifth mobile phone 205 |
| Second mobile phone 202 | First mobile phone 201, Fifth mobile phone 205 |
| Third mobile phone 203 | First mobile phone 201, Fifth mobile phone 205 |
| Fourth mobile phone 204 | First mobile phone 201, Third mobile phone 203 |
| Fifth mobile phone 205 | Second mobile phone 202 |

Fig. 6

Example:
Contents of
first SMS message
to be transmitted
to first mobile phone

> Earthquake with intensity 3 and threat of Tsunami hit Takamatsu-city, Kagawa prefecture around 10:30 on December 2, 2007. } Specific information display section
>
> Second mobile phone is at Urayasu-city, Chiba prefecture as at 10:08.
> Fourth mobile phone is at Shizuoka-city Shimizu-ku Ninomarucho, Shizuoka prefecture as at 8:30.
> Fifth mobile phone is at Takamatsu-city Kaminocho 1, Kagawa prefecture as at 10:15. } Location information display section for destination mobile phones
>
> Click http://dengon.jp/?b=0903347****&a=1 , if you are safe.
> Click http://dengon.jp/?b=0903347****&a=2 , if you are not safe. } URL display section for sending reply regarding safety

Fig. 7

| Mobile phone name | Phone number | Latitude | Longitude | Measurement time/date | Positioning accuracy | Safety information reception time/date | Safety information |
|---|---|---|---|---|---|---|---|
| First mobile phone 201 | 090-3347-***** | 35.657102 | 139.745820 | 10:36 on December 2, 2007 | 1 | 10:36 on December 2, 2007 | 1 |
| Second mobile phone 202 | 090-○○□□-××△△ | 35.632221 | 139.883071 | 10:31 on December 2, 2007 | 3 | 10:31 on December 2, 2007 | 1 |
| Third mobile phone 203 | 090-××○○-△△×× | 35.632224 | 139.883075 | 10:12 on December 2, 2007 | 3 | - | 0 |
| Fourth mobile phone 204 | 090-□□□□-○○×× | 35.022952 | 138.479662 | 08:30 on December 2, 2007 | 2 | - | 0 |
| Fifth mobile phone 205 | 090-△△××-□□×× | 34.321205 | 134.045113 | 10:32 on December 2, 2007 | 1 | 10:32 on December 2, 2007 | 2 |

Fig. 8

List of safety states of mobile phones' users to be notified to first mobile phone 201

| Reception means name | Location | Measurement time/date | Safety reply time/date | Safe or Not safe |
|---|---|---|---|---|
| Second mobile phone 202 | Urayasu-city, Chiba prefecture | 10:31 on December 2, 2007 | 10:31 on December 2, 2007 | Safe |
| Fourth mobile phone 204 | Shizuoka-city Shimizu-ku Ninomarucho, Shizuoka prefecture | 08:30 on December 2, 2007 | Not confirmed | Not confirmed |
| Fifth mobile phone 205 | Takamatsu-city Kaminocho 1, Kagawa prefecture | 10:32 on December 2, 2007 | 10:32 on December 2, 2007 | Not safe |
| | | | | |

Fig. 9

Example:
Contents of second SMS message to be transmitted to first mobile phone

Specific information display section:
- Earthquake with intensity 3 and threat of Tsunami hit Takamatsu-city, Kagawa prefecture around 10:30 on December 2, 2007.

Location information and safety information display section for destination mobile phones:
- Second mobile phone is at Urayasu-city, Chiba prefecture as at 10:31, and user is safe.
- Fourth mobile phone is at Shizuoka-city Shimizu-ku Ninomarucho, Shizuoka prefecture as at 8:30, and user's safety is unknown.
- Fifth mobile phone is at Takamatsu-city Kaminocho 1, Kagawa prefecture as at 10:32 and user is not safe.

Fig. 10

Example:
Contents of
first SMS message
to be transmitted
to first mobile phone

Earthquake with intensity
3 and threat of Tsunami
hit Takamatsu-city,
Kagawa prefecture
around 10:30 on
December 2, 2007.

Click
http://dengon.jp/?a=1
, if you are safe.

Click
http://dengon.jp/?a=2
, if you are not safe.

} Specific information display section

} URL display section for sending reply regarding safety

Fig. 11

| Mobile phone name | Mobile phones' names corresponding to location information to be contained in SMS message (Mobile phones' names corresponding to location information to be sent to transmission-destination mobile phone) | Designated area | Designated area preferred/ non-preferred |
|---|---|---|---|
| First mobile phone 201 | Second mobile phone 202, Fourth mobile phone 204, Fifth mobile phone 205 | Residence area | Preferred |
| Second mobile phone 202 | First mobile phone 201, Fifth mobile phone 205 | Residence area | Non-preferred |
| Third mobile phone 203 | First mobile phone 201, Fifth mobile phone 205 | Not designated | - |
| Fourth mobile phone 204 | First mobile phone 201, Third mobile phone 203 | Tokyo prefecture | Preferred |
| Fifth mobile phone 205 | Second mobile phone 202 | Shizuoka/ Kanagawa prefectures | Non-preferred |

INFORMATION TRANSMISSION SYSTEM

TECHNICAL FIELD

The present invention relates to an information transmission system, and particularly to an information transmission system for confirming safety information of the users of mobile phones.

BACKGROUND ART

There is proposed an information transmission system for confirming safety information of the users of mobile phones by use of a mobile phone. Patent Literature 1 discloses therein a location information management system in which information containing disaster information is transmitted via an e-mail and an access is made to a predetermined Web page from URL described in the e-mail thereby to cause the users to input safety information.

CITATION LIST

Patent Literature

Patent Literature 1: JP 2004-227245 A

SUMMARY OF INVENTION

Technical Problem

However, with the device according to Patent Literature 1, safety information and the like need to be input after accessing a predetermined URL, and if communication conditions are poor in a time of disaster, the information cannot be properly input to the end.

It is therefore an object of the present invention to provide an information transmission system capable of easily transmitting safety information even if communication conditions are poor.

Solution to Problem

An information transmission system according to the present invention comprises a message generation unit for creating a first message which contains specific information having information on a location and which is to be transmitted to mobile phones, and a database which is used for creating the first message and contains location information per mobile phone and safety information per user of the mobile phone, wherein the first message has two or more hyperlinks used for sending a reply regarding safety of a user of a transmission-destination mobile phone, URL information associated with the hyperlink contains different parameters depending on a type of the reply regarding safety of the user of the mobile phone, and the safety information in the database is updated based on the reply regarding safety by use of any one of the two or more hyperlinks.

Thereby, it is possible to transmit, to the transmission-destination mobile phones, information for promoting the users of the transmission-destination mobile phones to send a reply regarding safety in addition to the specific information having information on the location. The user of the transmission-destination mobile phone can send a reply regarding his/her state of safety only by clicking the hyperlink one time.

The reply regarding safety information may be sent while communication lines are congested, the number of communication lines available to general users is limited in order to prevent congestion and the address of a destination link is difficult to access. According to the present invention, the hyperlink in the first message is only clicked thereby to access the address of the destination link and to send a reply regarding safety information, and thus the safety information can be more easily transmitted thereby to enhance the possibility to transmit safety information even if communication conditions are poor than a reply regarding safety information is sent via a plurality of operations.

Preferably, the message generation unit makes at least either a determination as to whether to contain two or more hyperlinks in the first message, or an adjustment of a timing to transmit the first message on the basis of location information of the mobile phone, information on the location contained in specific information and contents of the specific information.

The user of a mobile phone who is far away from a location contained in the specific information such as disaster location is less likely to have a relationship with the specific information (to be involved in the disaster) and has a low demand to confirm the safety information. Therefore, an importance of the contents of the first message is changed depending on a distance from the location (disaster location) contained in the specific information, thereby adjusting the total amount of data to be originated.

The first message is transmitted sequentially to the mobile phones closer to a location contained in the specific information, thereby preferentially transmitting the information or confirming the state of safety to the users of the mobile phones who are likely to need the information.

More preferably, the message generation unit makes at least one of the determination and the adjustment in consideration of areas designated per mobile phone.

The importance or transmission timing of the first message can be adjusted according to an intended purpose of the user of the mobile phone.

Preferably, the message generation unit creates a second message which contains location information of a different mobile phone from the mobile phone and safety information of the user of the different mobile phone and is to be transmitted to the mobile phone after a lapse of certain time since it creates the first message.

Thereby, it is possible to transmit, to the transmission-destination mobile phone, the location information of the different mobile phones or the location information and safety information of the users of the different mobile phones in addition to the specific information having information on the location. The user of the transmission-destination mobile phone can confirm the contents of the specific information on viewing the second message, and can confirm a relationship between the locations of the users of the different mobile phones and the specific information, or whether the users are around the location associated with the specific information such as disaster, and their safety.

The safety information of the users of the different mobile phones can be confirmed by clicking a hyperlink contained in the first message to access a server (to access the address of the destination link) and by viewing the Web page containing a list of safety information, but the safety information of all the users of the mobile phones is not necessarily updated. The second message is created after a lapse of certain time since the first message is created, and can be originated in which the safety information so far recorded in the database is put together, thereby easily obtaining more useful safety information than immediately after the first message is created.

Origination from the communication carrier can be easily controlled on the downlink than the uplink for origination from the mobile phones, and thus the safety information can be accurately notified to the users at a proper timing.

Preferably, a predetermined identification mark is provided in part of an address of URL information associated with a hyperlink, and the mobile phone is installed with software for, when recognizing the predetermined identification mark, repeatedly accessing the address until a Web page with the address is viewable.

If the address of the destination link cannot be accessed by one browsing operation, some repeated accesses enable the safety information to be transmitted.

Preferably, when an access to an address of a destination link associated with the hyperlink is denied at a base transceiver station of the mobile phone, the base transceiver station transmits, to the server, information containing the identification information of the mobile phone which has accessed, and the database is updated based on the identification information.

In this case, the safety information is unknown, but an access from the mobile phone or the use of the mobile phone can be confirmed.

Preferably, the first message is transmitted via a radio access network of a communication carrier of the mobile phone.

The messages are transmitted via the radio access network or the like of the communication carrier, and thus the messages are likely to reach the mobile phones as compared with transmission of the messages via external Internet.

More preferably, the first message is SMS or EMS transmitted via a message processing system of the communication carrier of the mobile phone.

SMS or EMS is likely to send messages to the mobile phone more rapidly and accurately, which uses the message processing system for storing messages until the mobile phone for receiving the messages enters a receivable state, and transmitting the message to the transmission-destination mobile phone via a gateway mobile switching center in the receivable state.

Preferably, the safety information in the database is determined based on information on a phone number or a user of the mobile phone contained in the parameters, and a predetermined identifier.

Preferably, when an address of the URL information associated with the hyperlink is accessed from the mobile phone, the mobile phone displays a Web page with the address containing location information of a different mobile phone from the mobile phone and safety information of the user of the different mobile phone.

Preferably, the safety information in the database can be updated via a different device from the mobile phone to which the message is to be transmitted in a state where it can be discriminated from information updated via the mobile phone to which the message is to be transmitted.

Even when the mobile phone is broken due to submerging and a reply regarding safety information cannot be sent via the mobile phone, the safety information can be input and registered in the database.

Advantageous Effects of Invention

As described above, according to the present invention, it is possible to provide an information transmission system capable of easily transmitting safety information even when communication conditions are poor.

BRIEF DESCRIPTION OF DRAWINGS

FIG. 2 is a diagram illustrating contents of a first database before a reply regarding safety is received from a mobile phone.

FIG. 3 is a diagram illustrating contents of a second database.

FIG. 4 is a diagram illustrating contents of a third database.

FIG. 6 is a diagram illustrating contents of a first SMS message.

FIG. 7 is a diagram illustrating the contents of the first database after a reply regarding safety is received from the mobile phones.

FIG. 8 is a diagram illustrating a Web page viewable by clocking a first hyperlink or a second hyperlink.

FIG. 9 is a diagram illustrating contents of a second SMS message.

FIG. 10 is a diagram illustrating another foam of the first SMS message.

FIG. 11 is a diagram illustrating the contents of the third database added with information on designated areas and the like.

DESCRIPTION OF EMBODIMENT

Figure 1:
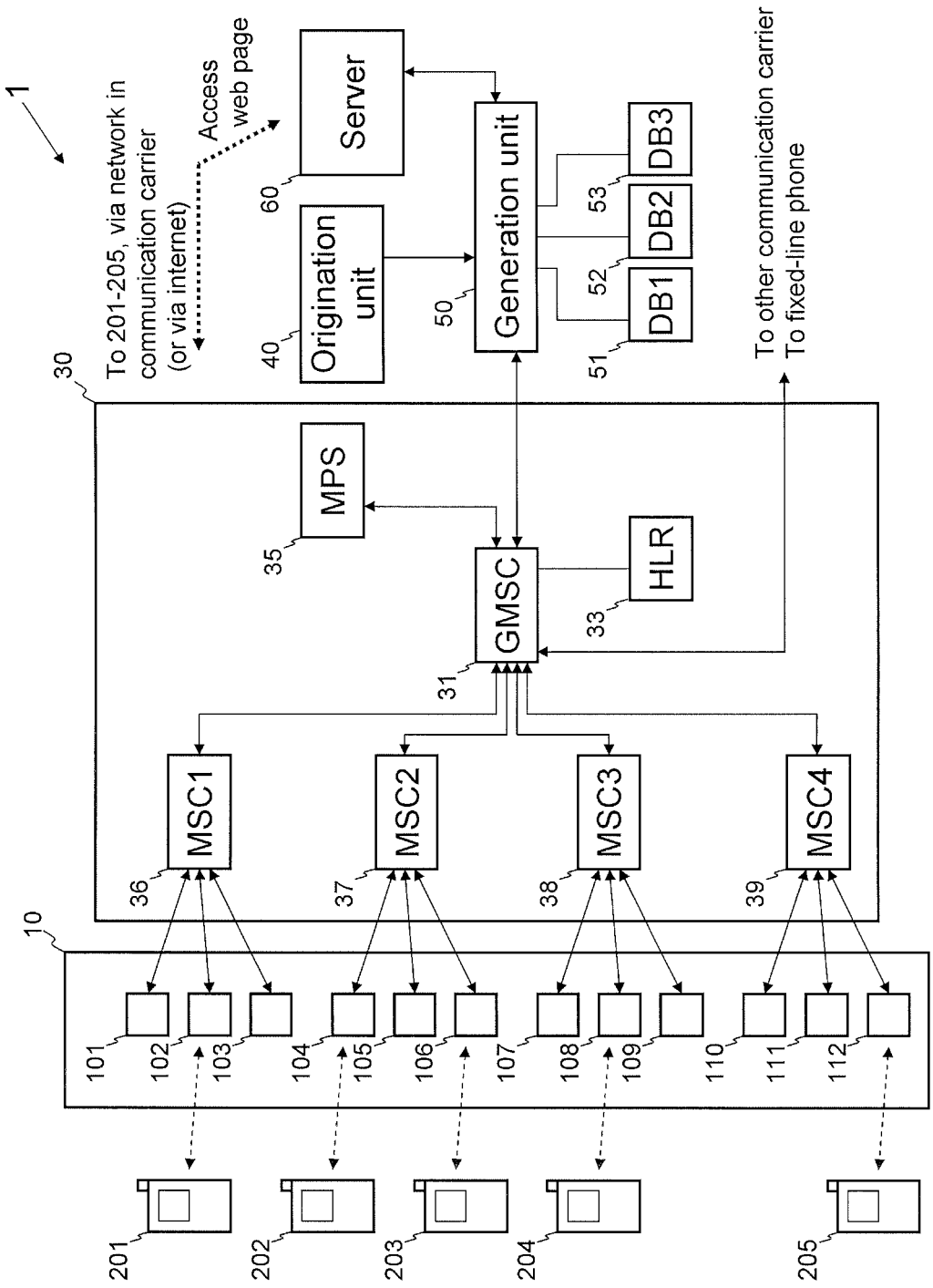
FIG. 1 is a structural diagram of an information transmission system according to the present embodiment.
Figure 5:
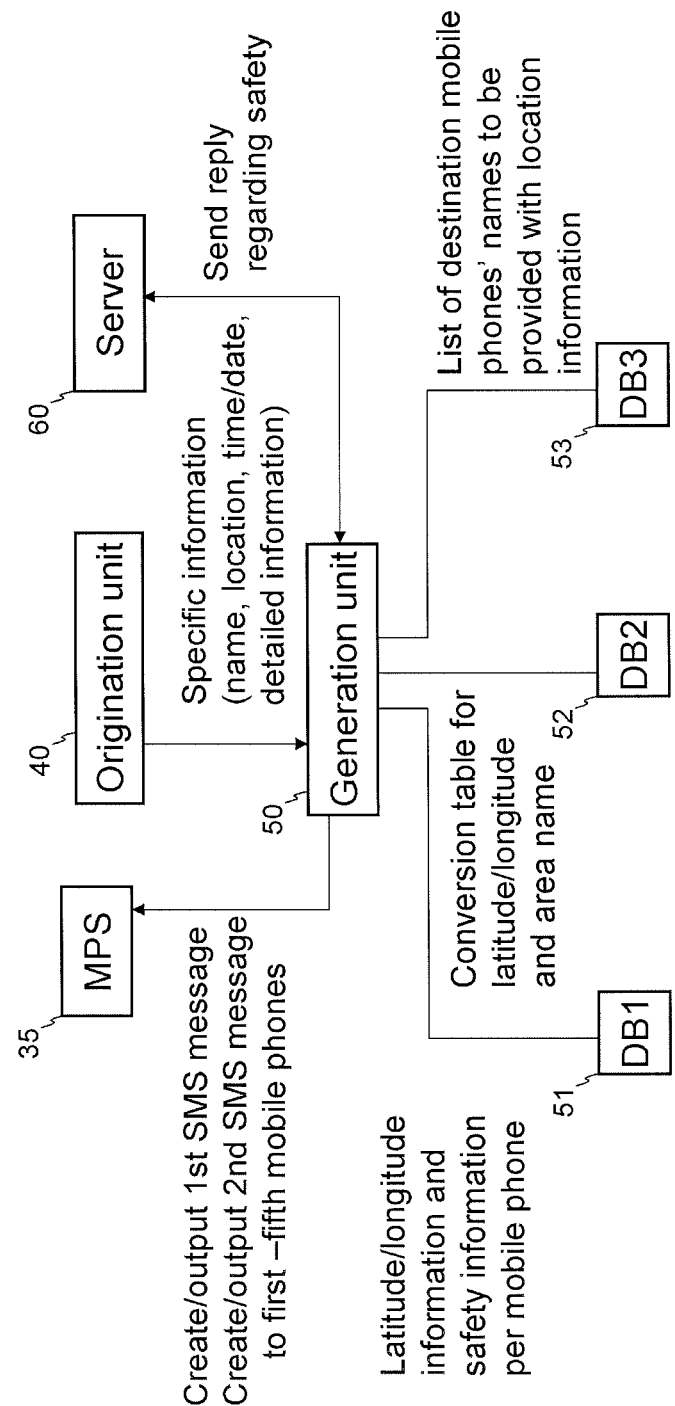
FIG. 5 is a structural diagram of the vicinity of a message generation unit.

An embodiment will be described below with reference to the drawings. An information transmission system 1 according to the present embodiment includes a radio access network (RAN) 10, a core network (CN) 30, an information source origination unit 40, a message generation unit 50, first to third databases 51 to 53, a sever 60, and first to fifth mobile phones 201 to 205 (see FIG. 1).

The radio access network 10 has first to 12th base transceiver stations (BTS) 101 to 112 for forming a radio link opposite to mobile phones. The core network 30 has a gateway mobile switching center (GMSC) 31 for connecting to telephone networks of other communication carriers and the like, a home location register (HLR) 33 as a database for managing user information such as mobile phone number or terminal identification number, a message processing system (MPS) 35 for holding SMS messages (first and second SMS messages) created for SMS (Short Message Service) until reception-destination mobile phones enter a receivable state, and first to fourth mobile switching centers (MSC) 36 to 39 for performing routing (selecting a communication route), call making/disconnecting, accounting, and the like of the mobile phones. The numbers of mobile phones and mobile switching centers are not limited to the above.

The first to fifth mobile phones 201 to 205 can make communication such as calls used in general mobile phones by use of the radio access network 10 and the core network 30. The communication includes communication (calls) with phones of other communication carriers or fixed-line phones via the gateway mobile switching center 31.

For example, communication (calls) can be made between the first mobile phone 201 and the second mobile phone 202 via the second base transceiver station 102, the first mobile switching center 36, the gateway mobile switching center 31, the second mobile switching center 37 and the fourth base transceiver station 104. When they are in the same mobile switching center area, they can make communication without the gateway mobile switching center 31. For example, the second mobile phone 202 and the third mobile phone 203 in the same area of the second mobile switching center 37 can make communication with each other via the fourth base transceiver station 104, the second mobile switching center 37 and the sixth base transceiver station 106.

Further, in the present embodiment, in addition to typical communication, the message generation unit 50 and the like are used to transmit, to the transmission-destination mobile phones (first to fifth mobile phones 201 to 205), the first SMS message in which location information of different mobile phones from the transmission-destination mobile phones and URL (Uniform Resource Locator) information for sending a reply regarding safety are added to specific information output from the information source origination unit 40. The message generation unit 50 and the like are used to transmit the second SMS message in which location information and safety information of different mobile phones from the transmission-destination mobile phone are added to the specific information to the transmission-destination mobile phones (first to fifth mobile phones 201 to 205).

That is, the first SMS message and the second SMS message are transmitted to the first to fifth mobile phones 201 to 205 irrespective of the locations in the specific information. The first SMS message contains the location information of different mobile phones from the transmission-destination mobile phone and the URL information for sending a reply regarding safety, and the second SMS message contains the location information and the safety information of different mobile phones from the transmission-destination mobile phone.

The first to third base transceiver stations 101 to 103 are connected to the first mobile switching center 36. The fourth to sixth base transceiver stations 104 to 106 are connected to the second mobile switching center 37. The seventh to ninth base transceiver stations 107 to 109 are connected to the third mobile switching center 38. The 10th to 12th base transceiver stations 110 to 112 are connected to the fourth mobile switching center 39. The first to fourth mobile switching centers 36 to 39, the HLR 33 and the message processing system 35 are connected to the gateway mobile switching center 31.

The HLR 33 acquires location information of the first to fifth mobile phones 201 to 205 from a VLR (Visitor Location Register) (not illustrated) as a location registration database per area covered by each of the first to fourth mobile switching centers 36 to 39. When location registration communication (communication which is always made between the mobile phones and the base transceiver stations in order to notify, to the core network 30, which base transceiver station's area the mobile phone is) is made in order to acquire the location information, the location information per mobile phone in the VLR and the HLR 33 is updated. The HLR 33 is used for specifying a location of the mobile phone which receives a call (originates a call) during normal communication, and is used for creating the first database 51 in the present embodiment.

The information source origination unit 40 outputs specific information to the message generation unit 50. The specific information contains at least information on locations. In the present embodiment, the specific information will be described as disaster information on earthquake, but may be other information. Further, it may be not only information which occurred in the past such as earthquake occurrence report but also information which is predicted to occur in the future such as earthquake forecast. The specific information contains information on type of disaster, location, and time/date. The present embodiment will be described assuming that the specific information indicates type of disaster: earthquake/intensity 3/threat of tsunami, location: Takamatsu-city, Kagawa-prefecture, and time/date: 10:30 on Dec. 2, 2007.

The information source origination unit 40 is installed at a location such as Japan Meteorological Agency where it can originate disaster information, in a state where it can be connected to the message generation unit 50 via a network. The information source origination unit 40 may not be installed and the specific information may be input in the message generation unit 50 in response to disaster information.

The message generation unit 50 configured of a personal computer or work station is connected to the gateway mobile switching center 31, the message processing system 35, the first to third databases 51 to 53, the information source origination unit 40 and the server 60. The message generation unit 50 is installed with software for performing control for creating the first to third databases 51 to 53 based on the information of the HLR 33 and the like, creating the first and second SMS messages per transmission-destination mobile phone based on the specific information output from the information source origination unit 40 and the first to third databases 51 to 53, and outputting the same to the message processing system 35. The message processing system 35 stores the first and second SMS messages until the mobile phones which are to receive the first and second SMS messages enter a receivable state, and transmits the first and second SMS messages to the transmission-destination mobile phones via the gateway mobile switching center 31 and the like in the receivable state.

The first database 51 is for the location information of the first to fifth mobile phones 201 to 205 using the information transmission system 1 according to the present embodiment, and the first database 51 is created based on the information of the HLR 33 and the like.

The first database 51 contains mobile phones' names, phone numbers (which may be other information such as users' names capable of identifying mobile phones), location information (latitude/longitude information), measurement time/date (temporal information), positioning accuracy, and safety information of the mobile phones' users (see FIG. 2). The message generation unit 50 acquires the location information of the first to fifth mobile phones 201 to 205 from the HLR 33 and acquires the safety information of the users of the first to fifth mobile phones 201 to 205 from the server 60 in order to create the first database 51.

The location information recorded in the HLR 33 is obtained by cell-base positioning calculated based on radio wave information from a single base transceiver station, and has an error of 100 to 10,000 meters. Therefore, in the present embodiment, the message generation unit 50 makes communication with the first to fifth mobile phones 201 to 205 via the gateway mobile switching center 31, the first to fourth mobile switching centers 36 to 39, and the first to 12th base transceiver stations 101 to 112, thereby obtaining location information with higher accuracy.

Specifically, when the mobile phone has a GPS (Global Positioning System) function for GPS measurement, the mobile phone acquires latitude/longitude information by GPS measurement, and when it does not have the GPS function or cannot make GPS measurement, it acquires latitude/longitude information by positioning with base transceiver stations which is calculated based on radio wave information from three or more base transceiver stations. An error can be reduced in tens of meters for GPS measurement, and in hundreds of meters for positioning with base transceiver stations. The latitude/longitude information by the GPS measurement or positioning with base transceiver stations may be transmitted to be overlapped on the radio waves used in typical location registration communication, or may be separately transmitted via other data communication (for example, to be overlapped on a signal to be transmitted for accessing the address of URL information associated with the first hyperlink or second hyperlink described later).

FIG. 2 illustrates latitude/longitude information and the like of the first to fifth mobile phones 201 to 205 as an exemplary first database 51. When communication with mobile phones is not possible due to power-off or the like, measurement time/date may be older (earlier) (see measurement time/date of the fourth mobile phone 204 in FIG. 2).

The positioning accuracy indicates a different value depending on a positioning method, and is used for determining a display range of an area name described later. In the present embodiment, the value is set at 1 for the GPS measurement with the highest positioning accuracy, the value is set at 2 for positioning with base transceiver stations with the second highest positioning accuracy, and the value is set at 3 for cell-base positioning.

The safety information and the safety information reception time/date indicate whether the users of the first to fifth mobile phones 201 to 205 are safe, and are updated based on the replies regarding safety using either the first or second hyperlink contained in the first SMS message.

For example, when URL (a link (first hyperlink) of "http://dengon.jp/?b=0903347**&a=1" in FIG. 6) indicating "I'm safe" in the URL display section for sending a reply regarding safety in the first SMS message transmitted to the first mobile phone 201 (mobile phone number: 090-3347-**) is clicked by an operation of the user of the first mobile phone 201 thereby to access the address of the URL information associated with the first hyperlink via a network, the user of the mobile phone to which the first SMS message is transmitted (the first mobile phone 201 which receives the first SMS message) is regarded as being safe, the value is set at parameter: 1 indicating "I'm safe" in the safety information section of the mobile phone, and the safety information reception time/date section is filled with a time when the first hyperlink is accessed.

When URL (a link (second hyperlink) of "http://dengon.jp/?b=0903347****&a=2" in FIG. 6) indicating "I'm not safe" in the URL display section for sending a reply regarding safety in the first SMS message transmitted to the first mobile phone 201 is clicked by an operation of the user of the first mobile phone 201 thereby to access the address of the URL information associated with the second hyperlink via a network, the user of the transmission source mobile phone (the first mobile phone 201 which receives the first SMS message) is regarded as being not safe, the value is set at parameter: 2 indicating "I'm not safe" in the safety information section of the mobile phone, and the safety information reception time/date section is filled with a time when the second hyperlink is accessed.

The initial value of the safety information parameter is set at 0, and the value thereof is changed to 1 or 2 when the address of the URL information associated with the first hyperlink or the second hyperlink is accessed. That is, when no access is made to the address of the URL information associated with the first hyperlink or the second hyperlink, the initial value is kept at 0. The safety information reception time/date section is blank until a reply regarding safety (an access to the address of the URL information associated with the first hyperlink or the second hyperlink) is made. FIG. 2 illustrates the first database 51 before receiving a reply regarding safety, and FIG. 7 illustrates the first database 51 after receiving replies regarding safety of the users of some mobile phones (replies regarding safety of the users of the first mobile phone 201, the second mobile phone 202 and the fifth mobile phone 205).

The location information (latitude/longitude information and measurement time/date) in the first database 51 may be created on the basis of other location information databases of the communication carrier.

The second database 52 is a table for converting latitude/longitude information to area names, and has latitude/longitude information, and the area names corresponding to the latitude/longitude information (see FIG. 3). The second database 52 is used for converting the latitude/longitude information of the first to fifth mobile phones 201 to 205 contained in the first database 51 into the area names corresponding to the areas close to the latitude/longitude information contained in the second database 52. In the present embodiment, names or lot numbers of municipalities are used as the area names, but facilities' names such as "Tokyo Disney Land" may be used.

For example, the latitude: 35.657102 degrees and the longitude: 139.745820 degrees of the first mobile phone 201 contained in the first database 51 are the closest to the latitude: 35.657143 degrees and the longitude: 139.745972 degrees corresponding to the area name. Minato-ku Shibakoen 4, Tokyo contained in the second database 52, and thus the second mobile phone 201 is calculated to be near the area name: Minato-ku Shibakoen 4, Tokyo, and the user of the second mobile phone 201 is estimated to be near the area name. Minato-ku Shibakoen 4, Tokyo.

The thus-calculated area name is contained in the first and second SMS messages described later. A range to be displayed as an area name (details of an area name described in the first and second SMS messages) is changed depending on the value of the positioning accuracy. Specifically, when the accuracy of the positioning method for acquiring latitude/longitude information is high, the area name with detailed location name is displayed, and when the accuracy is low, the area name with general area name is displayed. In the present embodiment, for GPS measurement, or when the value of the positioning accuracy is 1, the area name. Minato-ku Shibakoen 4, Tokyo containing the section name and lot number of the municipality is displayed, for positioning with base transceiver stations, or when the value of the positioning accuracy is 2, the area name: Minato-ku Shibakoen, Tokyo containing the section name of the municipality is displayed, and for cell-base positioning, or when the value of the positioning accuracy is 3, the area name. Minato-ku, Tokyo containing the name of the municipality or ward is displayed. The display range of the area name is not limited thereto, and is desirably set depending on the positioning accuracy.

The third database 53 has transmission-destination mobile phones' names, and mobile phones' names corresponding to the location information to be contained in the first SMS message or the second SMS message. The mobile phones' names corresponding to the location information to be contained in the first SMS message or the second SMS message are arbitrarily set by the users.

FIG. 4 illustrates, as an exemplary third database 53, that the location information (area names) and the safety information of the second mobile phone 202, the fourth mobile phone 204 and the fifth mobile phone 205 are transmitted to the first mobile phone 201, the location information and the safety information of the first mobile phone 201 and the fifth mobile phone 205 are transmitted to the second mobile phone 202, the location information and the safety information of the first mobile phone 201 and the fifth mobile phone 205 are transmitted to the third mobile phone 203, the location information and the safety information of the first mobile phone 201 and the third mobile phone 203 are transmitted to the fourth mobile phone 204, and the location information and the safety information of the second mobile phone 202 are transmitted to the fifth mobile phone 205. The corresponding mobile phones' numbers may be used instead of the mobile phones' names in the third database 53.

The GPS measurement or positioning with base transceiver stations is performed at intervals of a first time t1, for example each time location registration communication is made, and the first database 51 is updated in response to the communication in association with the update of the HLR 33. The second database 52 is a previously-created database (conversion table). The third database 53 is previously set by making an access to the message generation unit 50 from a mobile phone or a personal computer (not illustrated).

When receiving the specific information from the information source origination unit 40, the message generation unit 50 creates the first SMS message per transmission-destination mobile phone based on the specific information and the first to third databases 51 to 53, and outputs it to the message processing system 35. Specifically, the message generation unit 50 uses the second database 52 to convert the latitude/longitude information of the first to fifth mobile phones 201 to 205 contained in the first database 51 into the area names, and uses the area names as the location information for the first SMS message. The mobile phones' names required to be transmitted to the transmission-destination mobile phone are specified based on the third database 53.

The message generation unit 50 creates information for promoting the users of the transmission-destination mobile phones to send a reply regarding safety in order to confirm safety of the users of the transmission-destination mobile phones. Specifically, it creates a URL display section for sending a reply regarding safety having the first hyperlink for sending a reply that the user of the transmission-destination mobile phone is safe and the second hyperlink for sending a reply that the user of the transmission-destination mobile phone is not safe.

The URL information associated with the first hyperlink has the address of the Web page of a list of safety information, and information for identifying the transmission source by the server 60 (mobile phone number of the transmission-destination mobile phone and the identifier (=1) indicating being safe).

The URL information associated with the second hyperlink has the address of the Web page of a list of safety information and information for identifying the transmission source by the server 60 (mobile phone number of the transmission-destination mobile phone and the identifier (=2) indicting being not safe).

Based on the above, the message generation unit 50 creates the first SMS message having the specific information display section for displaying the specific information, the location information display section for displaying the location information of the mobile phones required to be transmitted to the transmission-destination mobile phone, and the URL information display section for sending a reply regarding safety.

The top part (specific information display section) of the first SMS message contains a message that "an earthquake with an intensity 3 and a threat of tsunami hit Takamatsu-city, Kagawa-prefecture around 10:30 on Dec. 2, 2007" containing type of disaster: earthquake/intensity 3/threat of tsunami, location: Takamatsu-city, Kagawa-prefecture, and time/date: 10:30 on Dec. 2, 2007.

When being transmitted to the first mobile phone 201, the middle part (location information display section) of the first SMS message has a message that "second mobile phone is at Urayasu-city, Chiba-prefecture as at 10:08. Fourth mobile phone is at Shizuoka-city Shimizu-ku Ninomaruchou, Shizuoka-prefecture as at 8:30. Fifth mobile phone is at Takamatsu-city Kaminocho 1, Kagawa-prefecture as at 10:15" containing the location information of the mobile phones required to be transmitted to the transmission-destination mobile phone. The area names displayed in the location information display section are adjusted in their display ranges (details) depending on the positioning accuracy.

The bottom part (URL display section for sending reply regarding safety) of the first SMS message has an instruction to click the first hyperlink when the user of the transmission-destination mobile phone is safe, or "Click the first hyperlink (URL information containing the address of the destination link, the transmission source mobile phone number, and the identifier indicating safety) when you are safe", and an instruction to click the second hyperlink when the user of the transmission-destination mobile phone is not safe, or "Click the second hyperlink (URL information containing the address of the destination link, the transmission source mobile phone number and the identifier indicating not-safe) when you are not safe."

The server 60, in which the address "http://dengon.jp" of the URL information associated with the first and second hyperlinks is accessed, reads the parameters after "?", and determines the state of safety per user of the mobile phone based on the mobile phone number after "b=" and the identifier after "a=" (1 for safe and 2 for not safe).

The information for identifying the mobile phone (mobile phone number or e-mail address) is contained in the URL information and read by the server 60, and the identification information may be originated by the mobile phone when accessing the address "http://dengon.jp" of the URL information associated with the first and second hyperlinks, to be read by the server 60.

Thereby, the location information of other mobile phones, and the information for promoting the users of the transmission-destination mobile phones to send a reply regarding safety can be transmitted to the transmission-destination mobile phones in addition to the specific information having information on locations.

On viewing the first SMS message, the users of the transmission-destination mobile phones can confirm the contents of the specific information and can further confirm a correlation between the locations of the users of other mobile phones and the specific information, or whether the users are near the location associated with the specific information on disaster or the like.

The user of the transmission-destination mobile phone clicks the first hyperlink or the second hyperlink in the URL information section for sending a reply regarding safety at the bottom part of the first SMS message so that the transmission-destination mobile phone activates the browser to access the address of the destination link (herein, http://dengon.jp) via a network. When receiving the access to the address of the destination link, the server 60 reads the contents of the latter part (mobile phone number or identifier indicating safe or not safe) of the first hyperlink or the second hyperlink, determines safety information per mobile phone, and updates the contents of the first database 51. The server 60 transmits the location information of other mobile phones to be contained in the first SMS message of the transmission-destination mobile phone and the information on the Web page containing a list of safety information of the user of the mobile phone on the basis of the updated contents of the first database 51, and the browser of the transmission-destination mobile phone displays the Web page (see FIG. 8).

The transmission-destination mobile phone may make an access to the address of the destination link via a network outside the communication carrier such as wireless LAN, in addition to the network in the communication carrier using the radio access network 10.

Thereby, the user of the transmission-destination mobile phone can send his/her safety information to the server 60 only by clicking the first hyperlink or the second hyperlink once.

The safety information may be replied while the communication lines are congested, the number of communication lines available to general users is limited in order to prevent congestion and the address of the destination link is difficult to access. In the present embodiment, either the first hyperlink or the second hyperlink in the first SMS message is only clicked thereby to access the address of the destination link and to send a reply regarding safety information, and thus the safety information can be more easily transmitted and the safety information is likely to be sent to the server 60 even if communication conditions are poor than the safety information is replied via a plurality of operations.

If the address of the destination link cannot be accessed by one browsing operation, there is assumed that predetermined software installed in the mobile phone is executed to repeatedly access the address of the destination link on the browser until the Web page is viewable. For example, an identification mark (part of the address (such as http) of the URL information associated with the hyperlinks is denoted in uppercase letters instead of typical lowercase letters) for repeating access trials is contained in the first hyperlink or the second hyperlink, and when the identification mark is recognized by the mobile phone, the predetermined software is executed to repeat the accesses until the Web page is viewable.

When the access to the address of the destination link associated with the first hyperlink or the second hyperlink is denied at a base transceiver station, there may be employed a form in which the base transceiver station transmits, to the server 60, the information containing the identification information (such as fixed number "ID:XXXXXX" contained in the SIM card) of the mobile phone making the access so that the first database 51 is updated based on the identification information. Specifically, when the base transceiver station is operable while a band (channel) to be allocated to the mobile phone is absent and a channel allocation request from the mobile phone cannot be met, the base transceiver station transmits, to the server 60, the information that the channel allocation request for the identification information of the mobile phone having made the channel allocation request is rejected, and the first database 51 is updated based on the information (a general base transceiver station only rejects the channel allocation request and does not transmit the information to the upper part, and thus the program of the base transceiver station is changed to be able to transmit the information). In this case, the safety information is unknown, but an access from the mobile phone, or the presence of the user of the mobile phone can be confirmed. Therefore, the identifier of the safety information section in the first database 51 is desirably set at a different identifier (such as "3" indicating "safety is unknown but the mobile phone has accessed") from "1" indicating that "I'm safe" or "2" indicating that "I'm not safe."

When receiving the specific information from the information source origination unit 40, the message generation unit 50 creates the second SMS message (see FIG. 9) per transmission-destination mobile phone based on the specific information and the first to third databases 51 to 53 after a lapse of a second time t2 (such as 20 minutes) since it creates the first SMS message, and outputs it to the message processing system 35. Specifically, the message generation unit 50 uses the second database 52 to convert the latitude/longitude information of the first to fifth mobile phones 201 to 205 contained in the first database 51 into the area names, and uses the area names as location information for the second SMS message. The mobile phones' names required to be transmitted to the transmission-destination mobile phone are specified based on the third database 53. The message generation unit 50 uses the safety information of the users of the first to fifth mobile phones 201 to 205 contained in the first database 51 for the second SMS message.

Based on the above, the message generation unit 50 creates the second SMS message containing the specific information display section for displaying the specific information, and the location information and safety information display section for displaying the location information of the mobile phones required to be transmitted to the transmission-destination mobile phone and the safety information of the users of the mobile phones.

The top part (specific information display section) of the second SMS message has a message that "an earthquake with an intensity 3 and a threat of tsunami hit Takamatsu-city, Kagawa-prefecture around 10:30 on Dec. 2, 2007" containing type of disaster: earthquake/intensity 3/threat of tsunami, location: Takamatsu-city, Kagawa-prefecture, and time/date: 10:30 on Dec. 2, 2007.

When being transmitted to the first mobile phone 201, the bottom part (location information and safety information display section) of the second SMS message has a message that "second mobile phone is at Urayasu-city, Chiba-prefecture and user is safe as at 10:31. Fourth mobile phone is at Shizuoka-city Shimizu-ku Ninomarucho, Shizuoka-prefecture and user's safety is unknown as at 8:30. Fifth mobile phone is at Takamatsu-city Kaminocho 1, Kagawa-prefecture and user is not safe as at 10:32" containing the location information of the mobile phones to be transmitted to the transmission-destination mobile phone and the safety information of the users of the mobile phones. The area names displayed in the location information display section are adjusted in their display ranges (details) depending on the positioning accuracy.

Thereby, the location information of other mobile phones or the location information and safety information of the users of other mobile phones can be sent to the transmission-destination mobile phones in addition to the specific information having information on locations. On viewing the second SMS message, the user of the transmission-destination mobile phone can confirm the contents of the specific information, and further can confirm a correlation between the locations of the users of other mobile phones and the specific information or whether the users are near the location associated with the specific information such as disaster, and are safe.

The safety information of the users of other mobile phones can be confirmed by clicking the first hyperlink or the second hyperlink contained in the first SMS message to access the server 60 (to access the address of the destination link), thereby viewing the Web page containing a list of safety information, but the safety information of all the users of the mobile phones is not necessarily updated. The second SMS message is created after a lapse of the second time t2 since the first SMS message is created, and the safety information so far recorded in the first database 51 can be collectively originated, thereby easily obtaining more useful safety information than immediately after the first SMS message is created.

The downlink originated from the message processing system 35 can be more easily controlled as to whether to originate by the communication carrier than the uplink originated from the mobile phones, thereby appropriately notifying the users of the safety information at a proper timing.

In the present embodiment, the radio access network 10 or the core network 30 of the communication carrier is used to transmit the messages (first and second SMS messages). Therefore, the messages are likely to reach the mobile phones as compared with transmission of messages via external Internet.

The messages transmitted by use of the radio access network 10 or the like of the communication carrier may assume and employ E-mail services specific to communication carriers such as EMS (Enhanced Messaging Service), MMS (Multimedia Messaging Service), and i-mode (registered trademark) in addition to SMS.

In the case of SMS or EMS, messages are transmitted to the phone number of the mobile phone, and in other cases, messages are transmitted to the e-mail address of the mobile phone. SMS or EMS is likely to send messages to the mobile phone more rapidly and accurately, SMS or EMS using the message processing system 35 which stores the first and second SMS messages until the mobile phone to receive the first and second SMS messages enters a receivable state, and transmits the first and second SMS messages to the transmission-destination mobile phone via the gateway mobile switching center 31 or the like in the receivable state.

There has been described in the present embodiment the form in which GPS measurement or positioning with base transceiver stations is typically performed in addition to cell-base positioning performed between the mobile phones and the base transceiver stations in order to enhance the positioning accuracy of the location information. The location information can be almost acquired by the cell-base positioning, and thus the GPS measurement may not be used. In this case, the message generation unit 50 does not need to control the gateway mobile switching center 31 and the like for the GPS measurement, and thus the system (software) can be simplified.

Since there may occur some situations in which the mobile phone is broken due to submerging and a reply regarding safety information cannot be sent via the mobile phone, there may be assumed such that a different device from the mobile phone to which the first SMS message is to be transmitted, such as pay phone, is used to make a call to a specific phone number (message service) thereby to perform an easy authentication procedure by use of a keyword for specifying the person such as mobile phone's number, password or birthday, and the safety information (1 for safe and 2 for not safe) is input and the safety information is registered in the first database 51 (written from a personal computer via Internet access). In this case, it is desirable that identification information indicating that the safety information is not via the mobile phone is added and can be discriminated from the safety information via the mobile phone.

The hyperlinks contained in the first SMS message are not limited to two (safe and not safe), and may be three or more (for example, identifier: 4 (injured), identifier: 5 (rescue needed) and the like may be added).

There has been described above that the first SMS message is provided with the specific information display section, the location information display section and the URL display section for sending a reply regarding safety, but a reply regarding safety information can be received only by the URL display section for sending a reply regarding safety. If the identification information of the mobile phone can be received in the server 60, even if the information for identifying the mobile phone such as mobile phone number is not contained in the parameters after "?" of the address of the URL information associated with the first and second hyperlinks, the mobile phone which has accessed can be identified in the base transceiver station. Thus, as illustrated in FIG. 10, the first SMS message may be configured of only the specific information display section and the URL information section for sending a reply regarding safety with the parameters for identifying a mobile phone omitted. In this case, the contents of the first SMS message are common among all the transmission-destination mobile phones, and thus the first SMS message can be easily created and may be broadcasted by use of CBS (Cell Broadcast Service) at the same time.

There has been described in the present embodiment that the messages having the same form are sent to all the destination mobile phones, but an importance of the message contents or a timing to transmit the message may be changed based on the location information of the mobile phone, the information on locations contained in specific information, or the contents of the specific information. In this case, the message generation unit 50 at least either determines whether to contain the first hyperlink and the second hyperlink in the first SMS message per mobile phone, or adjusts a timing to transmit the first SMS message on the basis of the location information of the mobile phone, the information on locations contained in specific information, and contents of the specific information.

For example, when information on locations contained in specific information and the contents of the specific information (such as time/date and magnitude of disaster) are compared with the location information of the mobile phone and location information acquisition time/date (measurement time/date), if a distance "d" between the location (disaster location) contained in the specific information and the mobile phone is a first distance d1 or more (d≥d1) based on the location information measured immediately before or immediately after the disaster occurrence time/date, the first SMS message having first contents containing only the specific information display section and not containing the location information display section for designated mobile phones and the URL display section for sending a reply regarding safety is transmitted from the information source origination unit 40, if the distance "d" is less than the first distance d1 and a second distance d2, which is shorter than the first distance d1, or more (d1>d≥d2), the first SMS message having second contents containing the specific information display section and the location information display section for designated mobile phones and not containing the URL display section for sending a reply regarding safety is transmitted, and if the distance "d" is less than the second distance d2 (d2>d), the first SMS message having third contents containing the specific information display section, the location information display section for designated mobile phones, and the URL display section for sending a reply regarding safety is transmitted.

For the transmission of the first SMS message, the first SMS message having the third contents is transmitted earlier, then the first SMS message having the second contents is transmitted, and then the first SMS message having the first contents is transmitted. Thereby, the first SMS message is transmitted sequentially to the mobile phones having the location information closer to the location contained in the specific information such as disaster location.

The first distance d1 and the second distance d2 are changed depending on the contents of the specific information, specifically the magnitude of the disaster, and it is desirable that if the magnitude (such as intensity) of the disaster is big, the first distance d1 and the second distance d2 are increased, and if the magnitude of the disaster is small, the first distance d1 and the second distance d2 are reduced.

The user of a mobile phone far away from the location contained in the specific information such as disaster location is less likely to relate to the specific information (to be involved in the disaster), and thus has a low demand to confirm the safety information. Therefore, the importance of the contents of the first SMS message is changed depending on the distance from the location (disaster location) contained in the specific information, thereby to adjust the total amount of data to be originated. The first message having the first contents does not need to be changed in its contents per transmission-destination mobile phone, and thus there is an advantage that the first SMS message can be easily created. The second SMS message contains information that safety confirmation is not performed in addition to information of being safe or not safe as a result of safety confirmation, and information of not being confirmed.

The first SMS message is transmitted sequentially to the mobile phones closer to the location (disaster location) contained in the specific information, and thus information transmission or safety confirmation can be preferentially performed to the users of the mobile phones which are likely to need the information.

Further, the importance of the contents of the first SMS message may be changed in consideration of areas (areas within a specific distance from the residence area of the user, and the like) designated by the user per mobile phone. In this case, the message generation unit 50 at least either determines whether to contain the first hyperlink and the second hyperlink in the first SMS message per mobile phone, or adjusts a timing to transmit the first SMS message on the basis of location information of the mobile phone, information on locations contained in specific information, contents of the specific information, and the areas designated per mobile phone.

Specifically, there is set such that according to the designated areas per mobile phone, the first SMS message is preferentially transmitted when the location information of the mobile phone is contained in the designated areas, or the first SMS message is non-preferentially transmitted. The setting information is contained in the third database 53 (see FIG. 11).

Specifically, when the location information of the mobile phone is within the designated areas in which the first SMS message is preferentially transmitted or is outside the designated areas in which the first SMS message is non-preferentially transmitted, the first SMS message having the third contents is transmitted even if the distance "d" between the disaster location and the mobile phone is the second distance d2 or more based on the location information measured immediately before or immediately after the disaster occurrence time/date.

The designated area may be a certain range containing the address of the user of the mobile phone contracted with the communication carrier, such as residence area, or may be set in prefecture or municipality name such as Tokyo.

FIG. 11 illustrates the third database 53, by way of example, in which the first mobile phone 201 is set such that the first SMS message is preferentially transmitted thereto when the designated area is "residence area" and the location information is contained in the designated area, the second mobile phone 202 is set such that the first SMS message is preferentially transmitted thereto when the designated area is "residence area" and the location information is contained outside the designated area (the first SMS message is non-preferentially transmitted thereto when the location information is contained in the designated area), the third mobile phone 203 does not designate an area, the fourth mobile phone 204 is set such that the first SMS message is preferentially transmitted thereto when the designated area is "Tokyo-prefecture" and the location information is contained in the designated area, and the fifth mobile phone 205 is set such that the first SMS message is preferentially transmitted thereto when the designated area is "Shizuoka-prefecture" and "Kanagawa-prefecture" and the location information is contained outside the designated area (the first SMS message is non-preferentially transmitted thereto when the location information is contained in the designated area).

Figure 12:
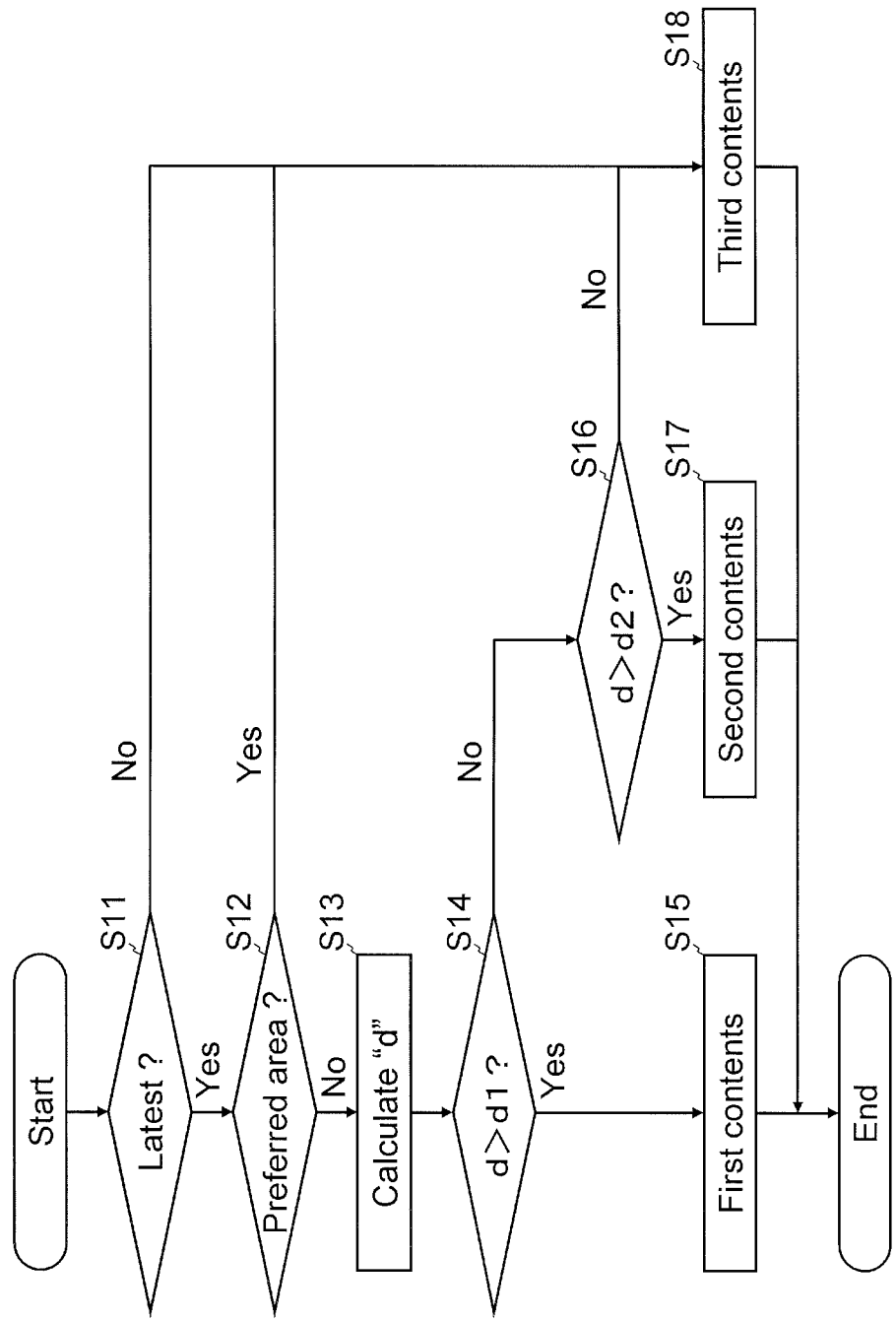
FIG. 12 is a flowchart illustrating a specific procedure of creating the first SMS message per transmission-destination mobile phone.

There will be described, with reference to the flowchart of FIG. 12, a specific procedure in which the message generation unit 50 receives the specific information from the information source origination unit 40 and creates the first SMS message per transmission-destination mobile phone based on the specific information and the first to third databases 51 to 53.

The third database 53 previously sets therein the designated areas per mobile phone, whether to preferentially transmit the first SMS message when the location information of the mobile phone is contained in the designated areas, and whether to non-preferentially transmit the first SMS message. The first distance d1 and the second distance d2 are determined based on the contents of the specific information (magnitude of disaster).

In step S11, the message generation unit 50 determines whether the location information of the mobile phone to which the first SMS message is to be transmitted is the latest. Specifically, when the measurement time/date is within a third time t3 (such as 1 hour), the location information is determined as the latest, and otherwise, the location information is determined as not the latest.

When the location information is the latest, the processing proceeds to step S12. When the location information is not the latest, the accurate location information of the mobile phone is determined as unknown, and the processing proceeds to step S18 (creation of the first SMS message, which is omitted, is not performed).

In step S12, the message generation unit 50 determines whether the location information measured immediately before or immediately after the disaster occurrence time/date (the latest location information) is contained in the designated areas of the mobile phone and within the areas in which the first SMS message is preferentially transmitted, or contained in the designated areas of the mobile phone and outside the areas in which the first SMS message is non-preferentially transmitted.

When the latest location information is contained in the designated areas of the mobile phone and within the areas in which the first SMS message is preferentially transmitted, or contained in the designated areas of the mobile phone and outside the areas in which the first SMS message is non-preferentially transmitted, the processing proceeds to step S18 in order to preferentially transmit the first SMS message. Otherwise, the processing proceeds to step S13.

In step S13, the message generation unit 50 calculates the distance "d" between the location (disaster location) contained in the specific information and the mobile phone based on the location information measured immediately before or immediately after the disaster occurrence time/date.

In step S14, the message generation unit 50 determines whether the distance "d" is longer than the first distance d1. When it is longer, the processing proceeds to step S15, and when it is not longer, the processing proceeds to step S16.

In step S15, the message generation unit 50 generates the first SMS message having the first contents containing only the specific information display section and not containing the location information display section for designated mobile phones and the URL display section for sending a reply regarding safety.

In step S16, the message generation unit 50 determines whether the distance "d" is longer than the second distance d2. When it is longer, the processing proceeds to step S17, and when it is not longer, the processing proceeds to step S18.

In step S17, the message generation unit 50 generates the first SMS message having the second contents containing the specific information display section and the location information display section for designated mobile phones and not containing the URL display section for sending a reply regarding safety.

In step S18, the message generation unit 50 generates the first SMS message having the third contents containing the specific information display section, the location information display section for designated mobile phones, and the URL display section for sending a reply regarding safety.

After the first SMS message for all the mobile phones to which the first SMS message is to be transmitted, the first SMS message having the third contents is transmitted, then the first SMS message having the second contents is transmitted, and then the first SMS message having the first contents is transmitted.

For example, when the residence area is designated and the designated area is set to be non-preferential, the first SMS message having the third contents containing the URL display section for sending a reply regarding safety is transmitted irrespective of the location relationship between locations contained in the specific information and the mobile phone when the location information of the mobile phone is outside the residence area. The importance or transmission timing of the first SMS message can be adjusted according to intended use of the user of the mobile phone such that the state of safety can be absolutely confirmed when the user is unfamiliar with the area, for example.

REFERENCE SIGNS LIST

1: Information transmission system
10: Radio access network
30: Core network
31: Gateway mobile switching center
33: HLR
35: Message processing system
36 to 39: First to fourth mobile switching centers
40: Information source origination unit
50: Message generation unit
51 to 53: First to third databases
60: Server
101 to 112: First to 12th base transceiver stations
201 to 205: First to fifth mobile phones

The invention claimed is:

1. An information transmission system comprising:
a message generation unit for creating a first message which contains specific information having information on a location and is to be transmitted to mobile phones; and
a database which is used for creating the first message and contains location information per mobile phone and safety information per user of the mobile phone;
wherein the first message has two or more hyperlinks to be used for sending a reply regarding safety of a user of a transmission-destination mobile phone,
wherein URL information associated with the hyperlink contains different parameters depending on a type of the reply regarding safety of the user of the mobile phone;
wherein the safety information in the database is updated based on the reply regarding safety using any one of the two or more hyperlinks; and
wherein when an address of the URL information associated with the hyperlink is accessed from the mobile phone, the mobile phone displays a Web page with the address containing location information of a different mobile phone from the mobile phone and safety information updated based on a reply regarding safety from the user of the different mobile phone.

2. The information transmission system according to claim 1, wherein the message generation unit makes at least either a determination as to whether to contain the two or more hyperlinks in the first message, or an adjustment of a timing to transmit the first message on the basis of location information of a mobile phone, information on the location contained in the specific information, and contents of the specific information.

3. The information transmission system according to claim 2, wherein the message generation unit makes at least either the determination or the adjustment in consideration of areas designated per mobile phone.

4. The information transmission system according to claim 1, wherein the message generation unit creates a second message which contains location information of a different mobile phone from the mobile phone and safety information of the user of the different mobile phone and is to be transmitted to the mobile phone after a lapse of certain time since it creates the first message.

5. The information transmission system according to claim 1, wherein a predetermined identification mark is provided in part of an address of the URL information associated with the hyperlink, and
the mobile phone is installed with software for, when recognizing the predetermined identification mark, repeatedly accessing the address until a Web page with the address is viewable.

6. The information transmission system according to claim 1, wherein when an access to an address of a destination link associated with the hyperlink is denied at a base transceiver station of the mobile phone, the base transceiver station transmits, to a server, information containing identification information of the mobile phone which has accessed, and the database is updated based on the identification information.

7. The information transmission system according to claim 1, wherein the first message is transmitted via a radio access network of a communication carrier of the mobile phone.

8. The information transmission system according to claim 7, wherein the first message is SMS or EMS transmitted via a message processing system of the communication carrier of the mobile phone.

9. The information transmission system according to claim 1, wherein the safety information in the database is determined based on information on a phone number or a user of the mobile phone contained in the parameters, and a predetermined identifier.

10. The information transmission system according to claim 1,
wherein the safety information in the database can be updated via a different device from the mobile phone, and
wherein information updated via the different device can be discriminated from information updated via the mobile phone.

11. An information transmission system comprising:
a message generation unit for creating a first message which contains specific information having information on a location and is to be transmitted to mobile phones; and
a database which is used for creating the first message and contains location information per mobile phone and safety information per user of the mobile phone,
wherein the first message has two or more hyperlinks to be used for sending a reply regarding safety of a user of a transmission-destination mobile phone;
wherein URL information associated with the hyperlink contains different parameters depending on a type of the reply regarding safety of the user of the mobile phone;
wherein the safety information in the database is updated based on the reply regarding safety using any one of the two or more hyperlinks; wherein a predetermined identification mark is provided in part of an address of the URL information associated with the hyperlink; and
wherein the mobile phone is installed with software for, when recognizing the predetermined identification mark, repeatedly accessing the address until a Web page with the address is viewable.

12. An information transmission system comprising:
a message generation unit for creating a first message which contains specific information having information on a location and is to be transmitted to mobile phones; and
a database which is used for creating the first message and contains location information per mobile phone and safety information per user of the mobile phone,
wherein the first message has two or more hyperlinks to be used for sending a reply regarding safety of a user of a transmission-destination mobile phone;
wherein URL information associated with the hyperlink contains different parameters depending on a type of the reply regarding safety of the user of the mobile phone;
wherein the safety information in the database is updated based on the reply regarding safety using any one of the two or more hyperlinks; and
wherein when an access to an address of a destination link associated with the hyperlink is denied at a base transceiver station of the mobile phone, the base transceiver station transmits, to the server, information containing identification information of the mobile phone which has accessed, and the database is updated based on the identification information.

\* \* \* \* \*